(12) United States Patent
Satomura (10) Patent No.: US 9,988,059 B2
(45) Date of Patent: Jun. 5, 2018

(54) VEHICLE BEHAVIOR DETECTION DEVICE

(71) Applicant: DENSO CORPORATION, Kariya, Aichi-pref (JP)

(72) Inventor: Shota Satomura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/251,916

(22) Filed: Aug. 30, 2016

(65) Prior Publication Data

US 2017/0073006 A1    Mar. 16, 2017

(30) Foreign Application Priority Data

Sep. 10, 2015  (JP) ................................. 2015-178366

(51) Int. Cl.
| | |
|---|---|
| B62D 11/00 | (2006.01) |
| B60W 50/14 | (2012.01) |
| B60Q 1/12 | (2006.01) |
| B60W 30/18 | (2012.01) |
| B60W 40/09 | (2012.01) |

(52) U.S. Cl.
CPC ............... B60W 50/14 (2013.01); B60Q 1/12 (2013.01); B60W 30/18145 (2013.01); B60W 40/09 (2013.01); B60W 2420/42 (2013.01); B60W 2520/10 (2013.01); B60W 2520/14 (2013.01); B60W 2540/20 (2013.01)

(58) Field of Classification Search
USPC .......................................................... 701/41
See application file for complete search history.

(56) References Cited

U.S. PATENT DOCUMENTS

| | | | | |
|---|---|---|---|---|
| 5,032,821 A | * | 7/1991 | Domanico | B60G 17/0185 180/197 |
| 5,428,512 A | * | 6/1995 | Mouzas | B60Q 1/12 362/249.13 |
| 5,900,813 A | * | 5/1999 | Ruminski | B60Q 1/2696 340/465 |

(Continued)

FOREIGN PATENT DOCUMENTS

JP          2010-191803 A       9/2010

*Primary Examiner* — Tyler Paige
(74) *Attorney, Agent, or Firm* — Knobbe, Martens, Olson & Bear, LLP (57) ABSTRACT

A vehicle behavior detection device mounted on an own vehicle detects own vehicle's behavior, in particular driver's right or left turn behavior at an intersection on a roadway. The vehicle behavior detection device is a microcomputer system having a CPU capable of providing an intended direction acquiring section, a turn direction acquiring section, a coincidence judgment section and an information output section. The intended direction acquiring section obtains an intended direction toward which the own vehicle is turning. The turn direction acquiring section acquires a direction to which the own vehicle turns. The coincidence judgment section detects whether or not the intended direction coincides with the turn direction of the own vehicle. The information output section provides warning regarding wide right or left turn of the own vehicle when the judgment result indicates that the intended direction does not coincide with the turn direction of the own vehicle.

12 Claims, 6 Drawing Sheets

(56) References Cited

U.S. PATENT DOCUMENTS

| | | | | |
|---|---|---|---|---|
| 6,393,362 | B1* | 5/2002 | Burns | G05D 1/0278 |
| | | | | 340/940 |
| 2003/0016127 | A1* | 1/2003 | Imawaki | B60Q 1/26 |
| | | | | 340/475 |
| 2005/0122215 | A1* | 6/2005 | Bernosky | B60Q 1/40 |
| | | | | 340/476 |
| 2011/0001819 | A1* | 1/2011 | Asari | G01C 21/3647 |
| | | | | 348/113 |
| 2013/0144521 | A1* | 6/2013 | Mathieu | G01C 21/365 |
| | | | | 701/410 |
| 2013/0204455 | A1* | 8/2013 | Chia | G07C 5/008 |
| | | | | 701/1 |
| 2015/0339926 | A1* | 11/2015 | Lange | G08G 1/167 |
| | | | | 340/902 |
| 2017/0073006 | A1* | 3/2017 | Satomura | B60W 50/14 |

* cited by examiner

VEHICLE BEHAVIOR DETECTION DEVICE

CROSS-REFERENCE TO RELATED APPLICATION

This application is related to and claims priority from Japanese Patent Application No. 2015-178366 filed on Sep. 10, 2015, the contents of which are hereby incorporated by reference.

BACKGROUND OF THE INVENTION

1. Field of the Invention

The present invention relates to vehicle behavior detection devices capable of detecting behavior of an own vehicle.

2. Description of the Related Art

Recently, there has been proposed a technique capable of detecting behavior of a vehicle. For example, patent document 1, Japanese patent publication No. 2010-191803 has proposed a conventional technique for capturing front view image including a preceding vehicle by using a camera unit mounted on the own vehicle, and detects whether or not the preceding vehicle is turning too widely on the basis of the captured front view image.

However, the conventional technique disclosed in the patent document 1 detects whether or not the preceding vehicle is turning widely on the basis of the captured front view image, but is difficult to detect whether or not the own vehicle is turning widely.

SUMMARY

It is therefore desired to provide a vehicle behavior detection device capable of correctly detecting whether or not an own vehicle is turning widely on the basis of image captured by a camera unit mounted on the own vehicle.

An exemplary embodiment provides a vehicle behavior detection device to be mounted on an own vehicle. The vehicle behavior detection device detects behavior of the own vehicle. The vehicle behavior detection device is a computer system configured to provide an intended direction acquiring section, a turn direction acquiring section, a coincidence judgment section and an information output section. The intended direction acquiring section acquires an intended direction to which the own vehicle turns. The turn direction acquiring section acquires a direction to which the own vehicle turns. The coincidence judgment section judges whether or not the intended direction coincides with the turn direction of the own vehicle. The information output section outputs warning information showing that the own vehicle is turning widely, i.e. moves with a large turn, not a proper turn, when the judgment result indicates negation, i.e. shows that the intended direction does not coincide with the turn direction of the own vehicle.

According to the structure of the vehicle behavior detection device previously described, it is possible for a driver of the own vehicle to obtain correct information regarding the behavior of the own vehicle. For example, when the own vehicle is turning widely, i.e. moves in a wide turn, not a proper turn, the vehicle behavior detection device provides driving support suitable for correcting the wide turn of the own vehicle to the driver of the own vehicle as well as providing warning information regarding occurrence of the wide turn behavior of the own vehicle.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a vehicle behavior detection device according to a first exemplary embodiment with reference to FIG. 1 to FIG. 5.

Figure 1:
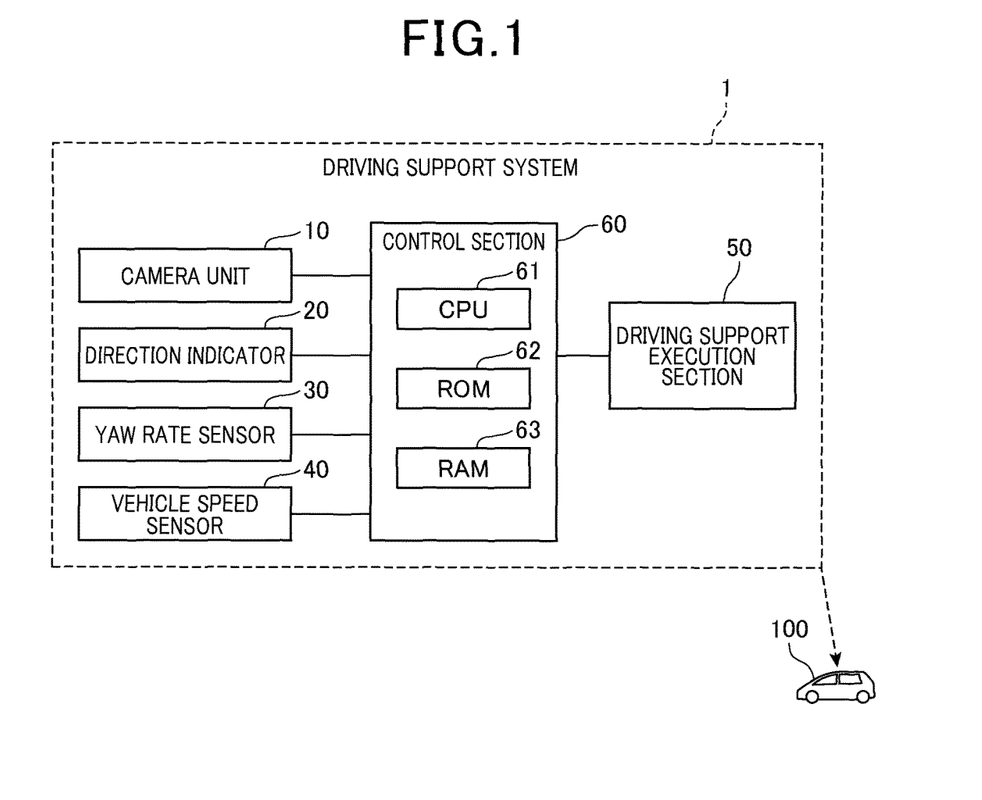
FIG. 1 is a view showing a block diagram of an overall structure of a driving support system having a control section as a vehicle behavior detection device according to a first exemplary embodiment of the present invention.

FIG. 1 is a view showing a block diagram of an overall structure of a driving support system 1 having a control section 60 as the vehicle behavior detection device according to the first exemplary embodiment.

(Structure)

Figure 5:
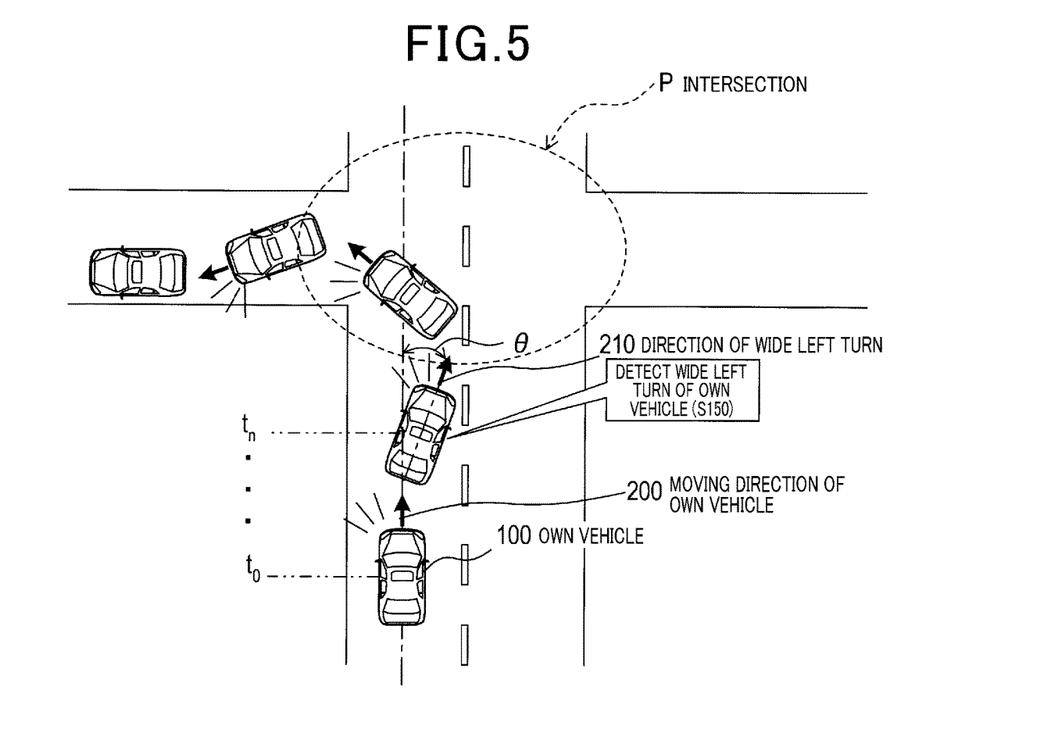
FIG. 5 is a view explaining a case in which the control section as the vehicle behavior detection device detects occurrence of wide left turn of the own vehicle.

The driving support system 1 is comprised of a camera unit 10, a direction indicator 20, a yaw rate sensor 30, a vehicle speed sensor 40, a driving support execution section 50 and the control section 60. The control section 60 acts as the vehicle behavior detection device. The driving support system 1 is mounted on an own vehicle 100. For example, FIG. 1 and FIG. 5 show the own vehicle 100 equipped with the driving support system 1 having the control section 60 as the vehicle behavior detection device.

The camera unit 10 is arranged on the back of a rear view mirror of the own vehicle 100 in order to capture a front view image of the road surface of a roadway in a front direction of the own vehicle 100. This front direction of the own vehicle 100 indicates the direction which extends forward from the own vehicle 100. The camera 10 captures a front view image of the own vehicle 100 every predetermined period of time, and outputs the captured image to the control section 60. The front direction of the own vehicle 100 indicates the direction in front of the own vehicle 100. On the other hand, the moving direction of the own vehicle 100 indicates the direction to move according to a steering angle of the own vehicle 100.

The driver of the own vehicle 100 operates the direction indicator 20 when the driver intends the own vehicle 100 to turn right or left. The direction indicator 20 outputs, as the intended direction, a direction signal to turn right or left. The direction indicator 20 does not generate and output the direction signal when the driver does not operate the direction indicator 20.

Hereinafter, the intended direction of the own vehicle 100 indicates the direction toward which the own vehicle 100 turns when viewed in the front direction of the own vehicle 100. The intended direction has an indicated right direction and an indicated left direction. The indicated right direction indicates that the driver of the own vehicle 100 intends to turn right, and the indicated left direction indicates that the driver of the own vehicle 100 intend to turn left when viewed from the moving direction of the own vehicle 100. In other words, the operation state of the direction indicator 20 indicates the intended direction of the own vehicle 100.

The yaw rate sensor 30 detects a turn direction of the own vehicle 100 and a turn angle, and outputs a yaw rate value to the control section 60. The turn direction indicates the direction to which the own vehicle 100 turns when viewed from the moving direction of the own vehicle 100. The turn angle indicates a magnitude of the turn motion of the own vehicle 100.

The yaw rate value has a positive sign or a negative sign which indicates the detected turn direction of the own vehicle 100. In the first exemplary embodiment, the positive sign of the yaw rate value indicates the right turn direction when viewed from the moving direction of the own vehicle 100, and the negative sign of the yaw rate value indicates the left turn direction when viewed from the moving direction of the own vehicle 100.

Hereinafter, the right turn direction of the own vehicle 100 indicates that the own vehicle 100 turns right when viewed from the moving direction of the own vehicle 100. Further, the left turn direction of the own vehicle 100 indicates that the own vehicle 100 turns left when viewed from the moving direction of the own vehicle 100.

The vehicle speed sensor 40 detects a vehicle speed of the own vehicle 100 and outputs a vehicle speed signal to the control section 60.

The driving support execution section 50 has devices to provide various functions for performing the process of the predetermined driving support, for example, a cruise assist function. The driving support indicates to support for the driver of the own vehicle 100 to perform safe driving, to provide various types of warnings to the driver of the own vehicle 100, and to perform automatic driving of the own vehicle 100.

The driving support execution section 50 in the driving support system 1 according to the first exemplary embodiment shown in FIG. 1 has at least head lamps.

When receiving instruction signals transmitted from the control section 60, the driving support execution section 50 can change an axial direction of each of the head lamps within a predetermined range on the basis of the received instruction signals so that the axial direction of each of the head lamps is aligned with the moving direction of the own vehicle 100, the right direction or left direction of the own vehicle 100 when viewed from the moving direction of the own vehicle 100.

The control section 60 is realized by using an available microcomputer system having a central processing unit (CPU) 61, a read only memory (ROM) 62, a random access memory (RAM) 63, an interface unit (omitted from the drawings), etc.

The control section 60 executes various control processes to perform various types of functions to support the driving of the own vehicle 100. For example, the control section 60 executes the driving support process which will be explained later.

(Driving Support Process)

A description will now be given of the driving support process executed by the control section 60, i.e. the CPU 61 as the behavior detection device and the driving support execution section 50 according to the first exemplary embodiment with reference to FIG. 2.

Figure 2:
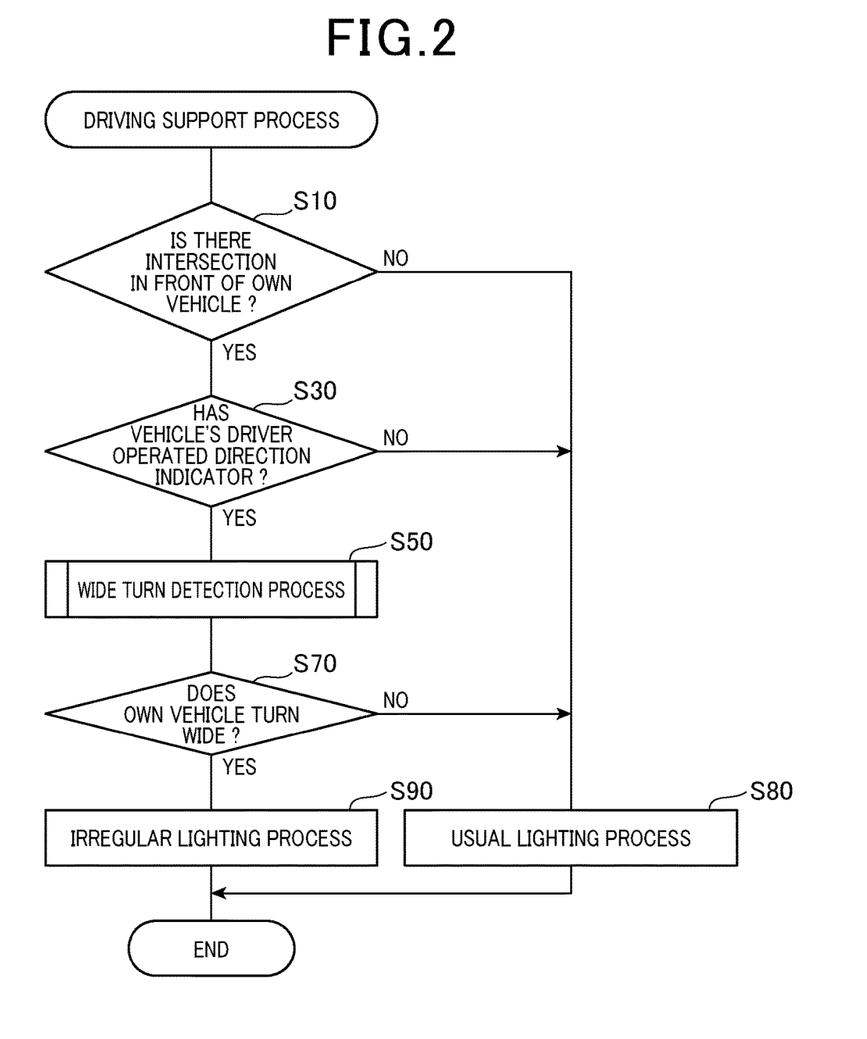
FIG. 2 is a flow chart of a driving support process executed by the control section as the vehicle behavior detection device according to the first exemplary embodiment of the present invention.

FIG. 2 is a flow chart of the driving support process executed by the vehicle behavior detection device according to the first exemplary embodiment. The control section 60 repeatedly executes the driving support process shown in FIG. 2 during the turned-on state of an accessary switch (ACC switch)

The driving support process instructs the head lamps to light an area toward the moving direction of the own vehicle 100 to which the driver of the own vehicle 100 intends to move. That is, in the driving support process, the control section 60 instructs the driving support execution section 50 in order for the head lamps to light the area toward the moving direction of the own vehicle 100. This makes it possible for the driver of the own vehicle 100 to have improved visibility at the front area toward the moving direction of the own vehicle 100 because the head lamps irradiates light toward the correct area in the moving direction of the own vehicle 100 to which the driver of the own vehicle 100 intends to move. The driving support process is the process performed by an adaptive front-lighting system (AFS).

In step S10, the control section 60 detects whether or not an intersection is present on the front area on the roadway in front of the own vehicle 100. Specifically, when receiving the images captured by and transmitted from the camera unit 10, the control section 60 detects whether or not a lane boundary line such as a white lane line or a yellow lane line is interrupted at the front area of the own vehicle 100 on the roadway. The control section 60 detects the presence of the intersection on the roadway in front of the own vehicle 100 when the detection result indicates the presence of interruption of the lane boundary line on the roadway toward the moving direction of the own vehicle 100. When the detection result in step S10 indicates negation ("NO" in step S10), i.e. there is no intersection on the roadway in front of the own vehicle 100, the operation flow progresses to step S80.

On the other hand, when the detection result in step S10 indicates affirmation ("YES" in step S10), i.e. the presence of an intersection is detected on the roadway in front of the own vehicle 100, the operation flow progresses to step S30.

In step S30, the control section 60 detects whether or not the driver of the own vehicle 100 has operated the direction indicator 20. In more detail, when the direction indicator 20 outputs an output signal to inform its operation state to the control section 60, as shown in FIG. 1, the control section 60 detects that the direction indicator 20 has been operated by the driver of the own vehicle 100.

When the detection result in step S30 indicates negation ("NO" in step S30), i.e. indicates that the direction indicator 20 outputs no output signal, the operation flow progresses to step S80.

On the other hand, when the detection result in step S30 indicates affirmation ("YES" in step S30), i.e. indicates that the direction indicator 20 has outputted the output signal, the operation flow progresses to step S50.

In step S50, the control section 60 starts to execute a wide turn detection process. That is, the control section 60 detects whether or not the own vehicle 100 is turning widely.

The wide turn indicates the behavior of the own vehicle 100 to turn in an opposite direction once, for example, at an intersection on the roadway, and then turn in its target moving direction when the own vehicle 100 turns right or left. For example, when the own vehicle 100 is running on an narrow roadway, and intends to turn right or left, or when the own vehicle 100 is a large-sized vehicle or a heavy vehicle such as a lorry truck, the own vehicle 100 moves once in the opposite direction, which is opposite to a target turn direction in order to keep an necessary turn radius of the own vehicle 100. After this, the own vehicle 100 turns right or left safely in the correct target direction on the roadway.

During the wide turn detection process, the control section 60 outputs wide turn information which inform that the own vehicle 100 is turning wide. The wide turn information, for example, a wide turn flag has a value of true (TRUE) when the wide turn process detects that the own vehicle 100 is currently turning widely. On the other hand, the wide turn information, i.e. the wide turn flag has a value of faulse (FALSE) when the wide turn process judges that the own vehicle 100 does not is currently turning widely. The operation flow progresses to step S70.

In step S70, the control section 60 detects whether or not the own vehicle 100 has the behavior of the wide turn. Specifically, when the detection result in step S70 indicates affirmation ("YES" in step S70), i.e. indicates that the wide turn information has the value of true (TRUE), the control section 60 detects occurrence of the wide turn of the own vehicle 100. The operation flow progresses to step S90.

On the other hand, when the detection result in step S70 indicates negation ("NO" in step S70), i.e. indicates that the wide turn information has the value of false (FALSE), the operation flow progresses to step S80.

The behavior of the own vehicle 100 indicates that the own vehicle 100 is turning right or left, or stops.

In step S80, the control section 60 completes the driving supporting process shown in FIG. 2 when no wide turn information is generated ("NO" in step S10, and "NO" in step S30), or when the wide turn information has the value of false (FALSE).

In step S80, the control section 60 performs the usual lighting process in which the control section 60 instructs the driving support execution section 50 in order for the head lamps to light the front area in the forward direction of the own vehicle 100 to which the own vehicle 100 moves. During the usual lighting process, the head lamps irradiate lights toward the moving direction of the own vehicle 100.

On the other hand, when outputting the wide turn information in step S90, i.e. when the detection result in step S70 indicates affirmation ("YES" in step S70), i.e. indicates that the wide turn information has the value of true (TRUE), the control section 60 performs an irregular lighting process (step S90). After the irregular lighting process, the control section 60 completes the driving support process shown in FIG. 2.

As previously described, the usual lighting process instructs the head lamps to irradiate lights toward the front area in the forward direction of the own vehicle 100 to which the own vehicle 100 moves.

On the other hand, in the irregular lighting process which is different from the usual lighting process, the control section 60 instructs the driving support execution section 50 in order for the head lamps to irradiate lights toward the intended direction side indicated by the direction indicator 20 determined in the wide turn detection process That is, when the intended direction indicated by the direction indicator 20 is right, the control section 60 instructs the driving support execution section 50 in order for the head lamps to irradiate lights toward the right side area toward the moving direction of the own vehicle 100

This process makes it possible for the head lamps to light the area at the intended direction side of the own vehicle 100.

That is, even if the own vehicle 100 is turning widely, it is possible for the head lamps to irradiate lights toward the area forward the moving direction of the own vehicle 100, and this makes it possible to increase and improve the driver's visibility toward the front area in the moving direction of the own vehicle 100. This provides safe driving of the driver of the own vehicle 100.

Next, a description will now be given of the wide turn detection process S50 in the driving support process with reference to FIG. 3.

Figure 3:
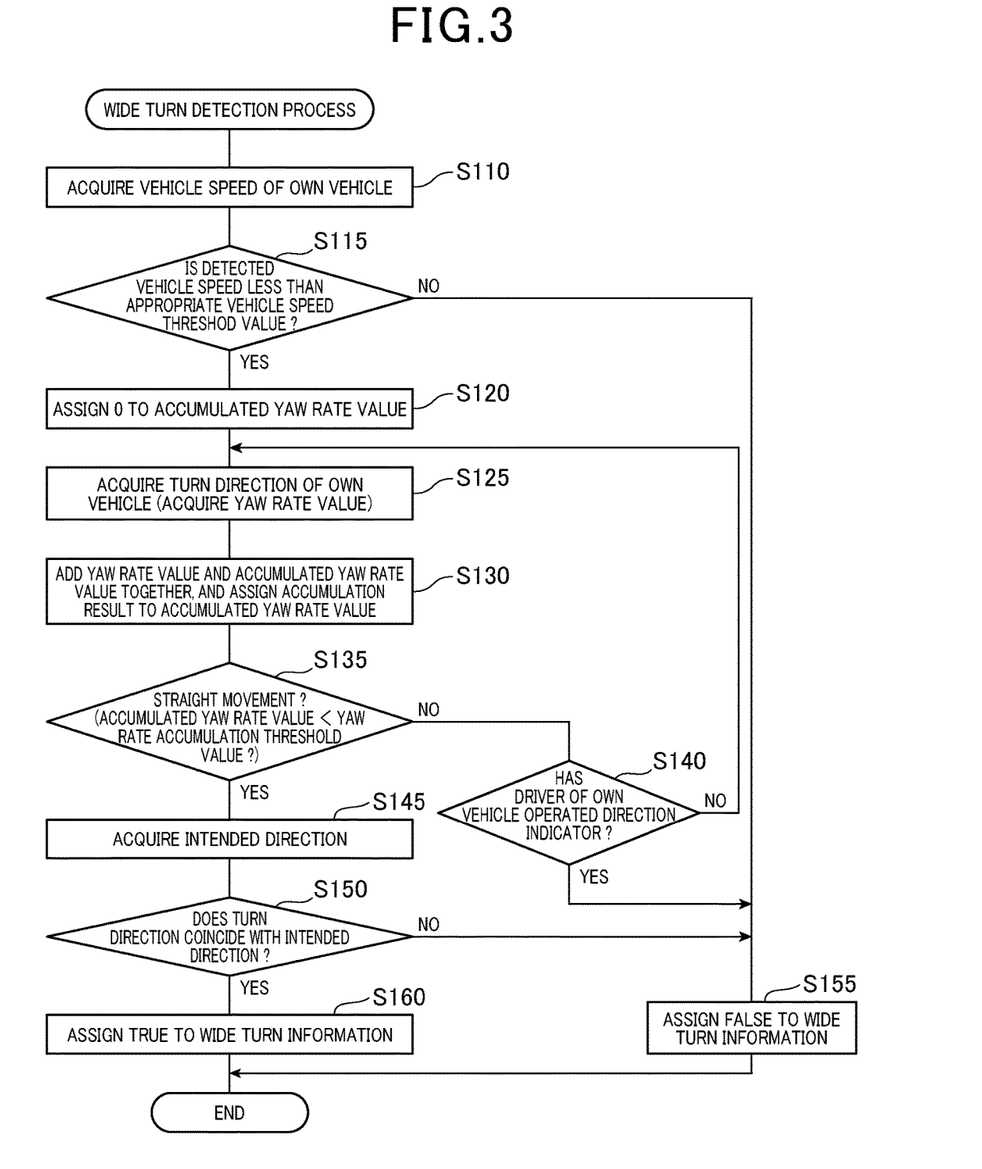
FIG. 3 is flow chart showing a wide turn detection process executed by the control section as the vehicle behavior detection device according to the first exemplary embodiment of the present invention.

FIG. 3 is flow chart showing the wide turn detection process S50 performed by the control section 60 as the vehicle behavior detection device according to the first exemplary embodiment.

In step S110, the control section 60 receives a vehicle speed signal which indicates a vehicle speed of the own vehicle 100 transmitted from the vehicle speed sensor 40. The operation flow progresses to step S115.

In step S115, the control section 60 judges whether or not the vehicle speed of the own vehicle 100 is an appropriate vehicle speed. The appropriate vehicle speed is a predetermined vehicle speed for the vehicle to safely turn right or left in the moving direction of the vehicle. Specifically, the control section 60 determines that the own vehicle 100 moves at the appropriate vehicle speed when the detected vehicle speed of the own vehicle 100 is less than an appropriate vehicle speed threshold value.

The appropriate vehicle speed threshold value is a maximum vehicle speed when the vehicle can turn right safety or turn left safely at an intersection on the roadway. For example, the appropriate vehicle speed threshold value has been determined within more than ten kilometers per hour (km/h) to several tens kilometers per hour (km/h). For example, the appropriate vehicle speed threshold value is 30 km/h. It is acceptable to vary the appropriate vehicle speed threshold value on the basis of a roadway condition. The operation flow progresses to step S120.

In step S120, the control section 60 initializes an accumulated yaw rate value. Specifically, the control section 60 assigns zero into the accumulated yaw rate value. The operation flow progresses to step S125.

In step S125, the control section 60 receives information regarding the turn direction of the own vehicle 100. Specifically, the control section 60 receives a yaw rate signal, which represents a yaw rate value, transmitted from the yaw rate sensor 30. As previously described, the sign of the yaw rate value indicates the turn direction, right or left of the own vehicle 100. The operation flow progresses to step S130.

In step S330, the control section 60 adds the yaw rate value into the accumulated yaw rate value, and stores the addition result into the memory section such as the RAM 63 shown in FIG. 1. The operation flow progresses to step S135.

In step S135, the control section 60 detects whether or not the own vehicle 100 moves straight, i.e. the own vehicle 100 has a straight movement.

The straight movement of the own vehicle 100 indicates that the moving direction 200 (see FIG. 5) of the own vehicle 100 coincides or approximately coincides with the front direction of the drive lane on the roadway on which the own vehicle is running.

The control section 60 according to the first exemplary embodiment determines and uses, as the front direction, the moving direction of the own vehicle 100 when the driver of the own vehicle 100 operates the direction indicator 20 (in step S30) during the driving support process for the first time after the control section 60 has recognized the presence of the intersection P (see FIG. 5, for example) in front of the own vehicle 100.

The technical term, that the direction of the driving lane of the own vehicle 100 approximately coincides with the front direction of the own vehicle 100, indicates a difference between the direction of the driving lane and the front direction of the own vehicle 100 is within a predetermined error range.

In particular, when the accumulated yaw rate value is less than a yaw rate accumulation threshold value, the control section 60 detects that the own vehicle 100 is moving straight. The operation flow progresses to step S140. The yaw rate accumulation threshold value has been determined in advance.

On the other hand, when the accumulated yaw rate value is not less than the yaw rate accumulation threshold value, the control section 60 detects that the own vehicle 100 is not moving straight. The operation flow progresses to step S145.

In step S140, the control section 60 detects whether or not the driver of the own vehicle 100 has operated the direction indicator 20, similar to the process in step S30 previously described.

When the detection result indicates negation ("NO" in step S140), i.e. the driver of the own vehicle 100 does not operate the direction indicator 20, the operation flow progresses to step S155.

On the other hand, when the detection result indicates affirmation ("YES" in step S140), i.e. the driver of the own vehicle 100 has operated the direction indicator 20, the operation flow returns to step S125. In this affirmation case, the control section 60 repeatedly executes the processes from step S125 to step S135. That is, the control section 60 repeatedly acquires the yaw rate value and accumulates the acquired yaw rate value to calculate the accumulated yaw rate value.

A description will now be given of the timing when the operation flow progresses to step S145 with reference to FIG. 4.

Figure 4:
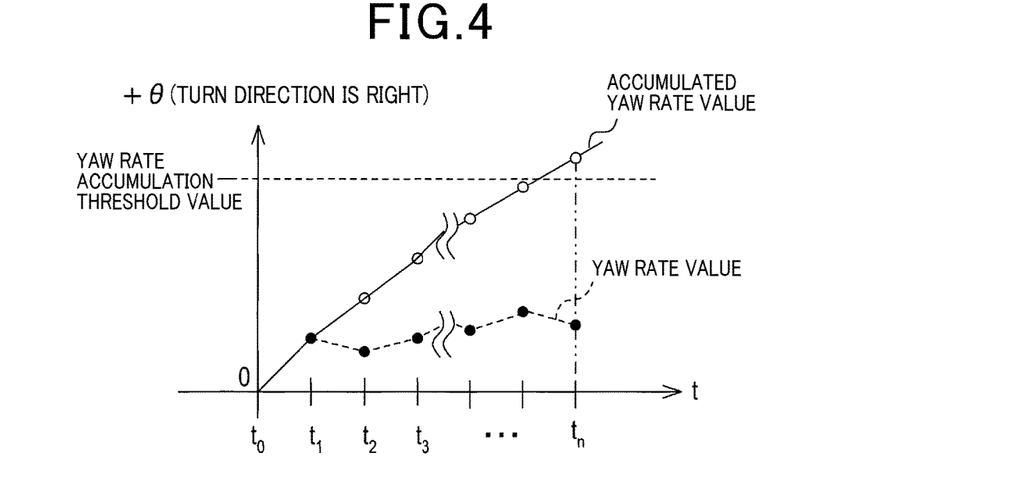
FIG. 4 is a view explaining a yaw rate value and a process of calculating an accumulated yaw rate value performed by the control section as the vehicle behavior detection device according to the first exemplary embodiment of the present invention.

FIG. 4 is a view explaining the calculation of the yaw rate value and the process of calculating the accumulated yaw rate value performed by the control section 60 as the vehicle behavior detection device according to the first exemplary embodiment.

As shown in FIG. 4, the control section 60 executes the initialization of the accumulated yaw rate value at timing t0 (step S120). In FIG. 4, the dotted line and black circles indicate the change of the yaw rate values which have been detected and acquired at timings t1, t2, . . . , and tn (step S125), respectively. On the other hand, the solid line and white circles indicate the change of the accumulated yaw rate value. For example, the accumulated yaw rate value exceeds the yaw rate accumulation threshold value at timing tn shown in FIG. 4.

Further, the timing t0 shown in FIG. 4 is approximately equal to the timing when the driver of the own vehicle 100 detects and recognizes the presence of an intersection P on the driveway in front of the own vehicle 100 and operates the direction indicator 20 (step S30).

FIG. 5 is a view explaining the case in which the control section 60 as the vehicle behavior detection device detects that the own vehicle 100 turns left wide.

As shown in FIG. 5, the operation flow progresses to step S145 when a turn angle θ of the own vehicle 100 becomes not less than a turn angle accumulation threshold value. The turn angle θ of the own vehicle 100 is measured from the moving direction 200 of the own vehicle 100 when the driver of the own vehicle 100 has operated the direction indicator 20 for the first time after the driver of the own vehicle 100 has detected and recognized the presence of the intersection in the front direction on the roadway.

In step S145, the control section 60 receives the intended direction of the own vehicle on the basis of the direction indicator 20 operated by the driver of the own vehicle 100. The operation flow progresses to step S150 from step S145.

The angle accumulation threshold value used in step S135 has been determined on the basis of an estimated value by which the own vehicle 100 can turn wide and safely at an intersection on the roadway.

In step S145 shown in FIG. 3, the control section 60 acquires the intended direction of the own vehicle 100. Specifically, the control section 60 acquires, as the intended direction of the own vehicle 100, the state of the direction indicator 20.

In step S150 shown in FIG. 3, the control section 60 detects whether or not the acquired turn direction obtained in step S125 coincides with the intended direction obtained in step S145.

When the detection result in step S150 indicates affirmation ("YES" in step S150), i.e. the acquired turn direction obtained in step S125 coincides with the intended direction, the operation flow progresses to step S155.

On the other hand, when the detection result in step S150 indicates negation ("NO" in step S150), i.e. the acquired turn direction obtained in step S125 does not coincide with the intended direction, the operation flow progresses to step S160.

The coincidence between the acquired turn direction and the intended direction indicates that both the turn direction of the own vehicle 100 and the intended direction are right, or left. On the other hand, non-coincidence indicates the turn direction of the own vehicle 100 is right and the intended direction is left, or the turn direction of the own vehicle 100 is left and the intended direction is right.

In step S155, the control section 60 stops outputting the wide turn information indicates that the own vehicle 100 is turning wide. Specifically, the control section 60 assign a value of FALSE to the wide turn information. The control section 60 completes the wide turn detection process shown in FIG. 3.

In step S160 shown in FIG. 3, the control section 60 outputs the wide turn information which indicates that the own vehicle 100 is turning widely. Specifically, the control section 60 assigns TRUE (the value of true) to the wide turn information. The control section 60 completes the wide turn detection process shown in FIG. 3.

That is, the control section 60 detects the occurrence of the wide turn of the own vehicle 100 when the acquired turn direction of the own vehicle 100 is different from the intended direction of the own vehicle 100, and assigns TRUE (the value of true) to the wide turn information (step S160).

On the other hand, the control section 60 detects no occurrence of the wide turn of the own vehicle 100 when the acquired turn direction of the own vehicle 100 coincides with the intended direction of the own vehicle 100, and assigns FALSE (the value of false) to the wide turn information (step S155).

By the way, in cases when the vehicle speed of the own vehicle 100 is less than the appropriate vehicle speed threshold value, and when the control section 60 detects that the own vehicle 100 moves straight on the roadway, the control section 60 assigns FALSE (the value of false) to the wide turn information in order to inhibit the output of the wide turn information to the driving support execution section 50 (step S155).

(Effects)

A description will now be given of effects of the control section 60 as the vehicle behavior detection device according to the first exemplary embodiment.

[1A] Under the case in which the driver of the own vehicle 100 intends to turn the own vehicle 100 at an intersection, when the intended direction of the own vehicle 100 is different from the detected turn direction of the own vehicle 100 (non-coincidence occurs), the control section 60 detects that the own vehicle 100 is turning widely at the intersection. This detection makes it possible for the control section 60 as the vehicle behavior detection device to output correct information to the driving support execution section 50. The driving support execution section 50 can provide the correct driving support when the own vehicle 100 is turning widely. For example, the driving support section 50 performs the irregular lighting process (step S90 shown in FIG. 2), i.e. instructs the head lamps to illuminate the chosen direction of travel, either left or right to realize advanced front lighting system (AFS).

For example, AFS automatically turns on low beams according to vehicle speed and steer to provide better visibility. When driving on a winding road, AFS will change the lighting pattern to compensate for the curvature of the roadway to help enhance night visibility. Further, at crossroads, AFS will illuminate the chosen direction of travel of the own vehicle 100, either left or right.

[1B] When the vehicle speed of the own vehicle 100 is not less than the predetermined vehicle speed as the appropriate vehicle speed value, the control section 60 detects that the driver of the own vehicle 100 does not intend to turn wide.

In general, it can be considered that the driver of the own vehicle 100 adequately reduces the vehicle speed of the own vehicle 100 when the driver of the own vehicle 100 intends to turn the own vehicle 100 right or left at an intersection of the roadway. Accordingly, it can be determined to prevent the own vehicle 100 from being turning right or left at the intersection when the acquired vehicle speed of the own vehicle 100 is not less than the vehicle speed threshold speed.

Accordingly, when the acquired vehicle speed of the own vehicle 100 is not less than the predetermined vehicle speed as the appropriate vehicle speed by which the own vehicle 100 turns right or left safely ("NO" in step S115), the control section 60 inhibits output of the wide turn information. This process makes it possible for the control section 60 to perform the wide turn detection process only when the own vehicle 100 turns.

[1C] When the own vehicle 100 does not move straight ("NO" in step S135), the control section 60 detects whether or not the own vehicle 100 is turning widely (step S150). This makes it possible to execute the wide turn detection process of the own vehicle 100 except for a small turn due to fluctuation of the steering wheel of the own vehicle 100, and to increase accuracy of the judgment result.

[1D] The control section 60 receives the operation state of the direction indicator 20 as the intended direction of the own vehicle 100. This makes it possible for the control section 60 to specify the turn direction, right or left, of the own vehicle 100 securely.

[1E] For example, when detecting occurrence of the wide turn of the own vehicle 100, the control section 60 executes the driving support process (step S90), the operation of which has been predetermined. This makes it possible to execute the driving support suitable for performing the wide turn of the own vehicle 100.

During the driving support process performed by the control section 60 as the vehicle behavior detection device according to the first exemplary embodiment, the control section 60 instructs the driving support execution section 50 to operate the head lamps to light the front area in the intended direction side of the own vehicle 100 after the timing to when the control section 60 has detected a wide left turn 210 of the own vehicle 100 shown in FIG. 5. This head lamp control process makes it possible to irradiate lights toward the front area of the own vehicle 100 even if the own vehicle 100 is turning widely, for example, at an intersection of the roadway, and increase the driver's visibility.

In the first exemplary embodiment, the control section 60 corresponds to the vehicle behavior detection device, the process in step S125 corresponds to a turn direction acquiring section, the process in step S145 corresponds to an intended direction acquiring section, the process in step S150 corresponds to a coincidence detection section, the process in step S160 corresponds to an information output section. Further, the process in step S110 corresponds to a vehicle speed acquiring section, the process in step S115 corresponds to an appropriate vehicle speed detection section, the process in step S155 corresponds to a first inhibition section and a second inhibition section.

The process in step S135 corresponds to a straight movement detection section, and the process in step S90 corresponds to a wide turn driving support section.

Second Exemplary Embodiment

A description will be given of the vehicle behavior detection device according to a second exemplary embodiment with reference to FIG. 6.

Figure 6:
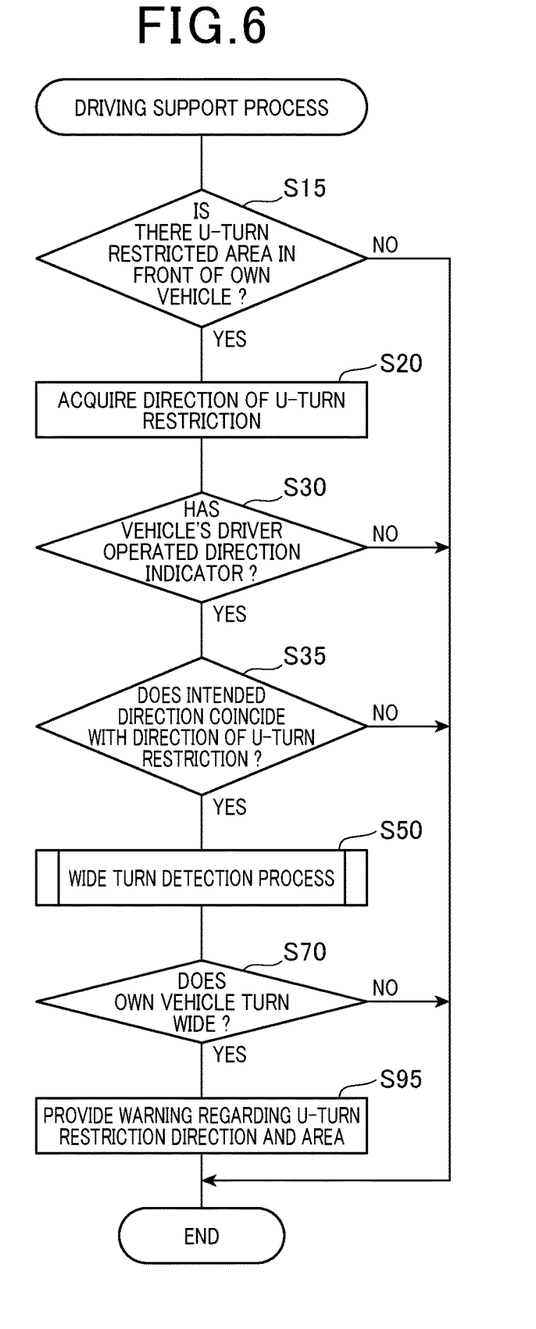
FIG. 6 is a flow chart showing a driving support process executed by the control section as the vehicle behavior detection device according to a second exemplary embodiment of the present invention.

FIG. 6 is a flow chart showing the driving support process executed by the control section 60 as the vehicle behavior detection device according to the second exemplary embodiment.

(Difference Between the First Exemplary Embodiment and the Second Exemplary Embodiment)

Because the structure and behavior of the control section 60 according to the second exemplary embodiment is basically equal to these of the control section according to the first exemplary embodiment previously described, the difference between them will be explained.

The control section 60 according to the first exemplary embodiment previously described executes the driving support process to realize the adaptive front-lighting system (AFS).

On the other hand, the driving support execution section 50 and the control section 60 according to the second exemplary embodiment perform the driving support process to provide warning when the driver of the own vehicle 100 to perform U-turn operation on a U-turn restricted roadway.

In order to perform the driving support process, the driving support execution section 50 uses a speaker instead of using the head lamps. The driving support process (shown in FIG. 6) performed by the control section 60 (i.e. the CPU 61) executes the processes in step S15 and step S95 shown in FIG. 6 instead of executing the process in step S10 and step S90 shown in FIG. 2. Further, the control section 60 according to the second exemplary embodiment shown in FIG. 6 executes additional processes in steps S20 and S35, not execute the process in step S80 shown in FIG. 2.

(Process)

A description will now be given of the driving support process performed by the control section 60 as the vehicle behavior detection device according to the second exemplary embodiment with reference to FIG. 6.

In step S15, the control section 60 detects whether or not the front area of the own vehicle 100 on the roadway is a U-turn restricted area. Specifically, the control section 60 executes the image processing of image data which has been captured by the camera unit 10 in order to detect a U-turn restriction mark or a traffic sign painted on a roadway.

The U-turn restriction mark indicates the U-turn restricted area on the roadway and the direction thereof. When detecting the presence of the U-turn restriction mark, the control section 60 detects that the front area of the own vehicle 100 is the U-turn restriction area.

When the detection result in step S15 indicates that the front area is not the U-turn restriction area, the control section 60 completes the driving support process shown in FIG. 6.

On the other hand, the operation flow progresses to step S20 when the detection result in step S15 indicates the presence of the U-turn restriction area.

In step S20, the control section 60 acquires the direction of the U-turn restriction. This direction of the U-turn restriction indicates the direction to inhibit the own vehicle from doing the U-turn movement. Specifically, the control section 60 acquires the information regarding the direction of the U-turn restriction on the basis of the U-Turn restriction mark in the image captured by the camera unit 10 in step S15.

It is also acceptable for the control section 60 to obtain the information regarding the direction of the U-turn restriction on the roadway by using various methods. For example, it is acceptable to obtain information regarding a vehicle traffic separation, and recognize, as the direction of the U-turn restriction, the direction which is opposite from the direction of the vehicle traffic separation. That is, the direction of the vehicle traffic separation indicates the left hand traffic or right hand traffic. For example, the direction of the vehicle traffic separation is left, the direction of the U-turn restriction is right. The operation flow progresses to step S30.

In step S30, the control section 60 detects whether or not the driver of the own vehicle 100 has operated the direction indicator 20. When the detection result in step S30 indicates negation ("NO" in step S30), i.e. indicates that the direction indicator 20 outputs no output signal, the control section 60 completes the driving support process shown in FIG. 6.

On the other hand, when the detection result in step S30 indicates affirmation ("YES" in step S30), i.e. indicates that the direction indicator 20 has outputted the output signal, the operation flow progresses to step S35.

In step S35, the control section 60 detects whether or not the intended direction indicated by the direction indicator 20 is equal to the direction of the U-turn restriction.

When the detection result in step S35 indicates negation ("NO" in step S35), i.e. indicates that the intended direction indicated by the direction indicator 20 does not coincide with the direction of the U-turn restriction, the control section 60 completes the driving support process shown in FIG. 6.

On the other hand, when the detection result in step S35 indicates affirmation ("YES" in step S35), i.e. indicates that the intended direction indicated by the direction indicator 20 coincides with the direction of the U-turn restriction, the operation flow progresses to step S50.

In step S50, the control section 60 performs the wide turn detection process shown in FIG. 3. Because the wide turn detection process has been previously explained in detail, the explanation regarding the wide turn detection process is omitted here for brevity. The operation flow progresses to step S70.

In step S70, the control section 60 detects whether or not the own vehicle 100 is turning wide.

When the detection result in step S70 indicates negation ("NO" in step S70), the control section 60 completes the driving support process shown in FIG. 6.

On the other hand, when the detection result in step S70 indicates affirmation ("YES" in step S70), i,e, indicates that the own vehicle 100 is turning wide, the operation flow progresses to step S95.

When the direction indicator 20 has indicated the direction of the U-turn restriction area ("YES" in step S35), and the own vehicle 100 is turning wide ("YES" in step S70), the operation flow progresses to step S90.

In step S90, the control section 60 instructs the driving support section 50, for example, a speaker unit (not shown) to provide warning regarding the U-turn restriction direction and area to the driver of the own vehicle 100

When the driver of the own vehicle 100 has operated the direction indicator 20 to move the direction of the U-turn restriction (i.e. the intended direction indicates the direction of the U-turn restriction) and the own vehicle 100 starts to turn in the opposite direction to the direction of the U-turn restriction, the control section 60 generates warning regarding the wide turn behavior of the own vehicle 100, and outputs the warning to the driver of the own vehicle 100.

(Effects)

A description will now be given of the effects of the control section 60 as the vehicle behavior detection device according to the second exemplary embodiment.

[2A] Under the case when the driver of the own vehicle 100 has operated the direction indicator 20 and the direction indicator 20 indicates the intended direction which is opposite to the direction of the U-turn restriction at the U-turn restriction area, and the driver of the own vehicle 100 operates the steer wheel to turn wide in the direction which is opposite to the direction of the U-turn restriction, the control section 60 detects the occurrence of the wide turn behavior of the own vehicle 100 and provides to the driver of the own vehicle 100 warning regarding that the own vehicle 100 is on the U-turn restriction area. This makes it possible to provide warning certainly regarding the U-turn restriction area to the driver of the own vehicle 100.

The process in step 95 shown in FIG. 6 performed by the control section 60 as the vehicle behavior detection device according to the second exemplary embodiment corresponds to a wide turn driving support section.

Third Exemplary Embodiment

A description will be given of the vehicle behavior detection device according to a third exemplary embodiment with reference to FIG. 7.

As previously described, the control section 60 according to the second exemplary embodiment detects the wide turn of the own vehicle 100 at an intersection on the roadway. However, the concept of the present invention is not limited by the disclosure of the second exemplary embodiment. For example, it is possible for the control section 60 to execute the wide turn detection of the own vehicle 100 (which is performed by the process in step S150) when the driver of the own vehicle 100 intends to turn right or left to move to a shop from the drive lane on the roadway, where the shop is located along the roadway.

A description will now be given of the wide turn detection process executed by the control section 60 according to the third exemplary embodiment with reference to FIG. 7.

Figure 7:
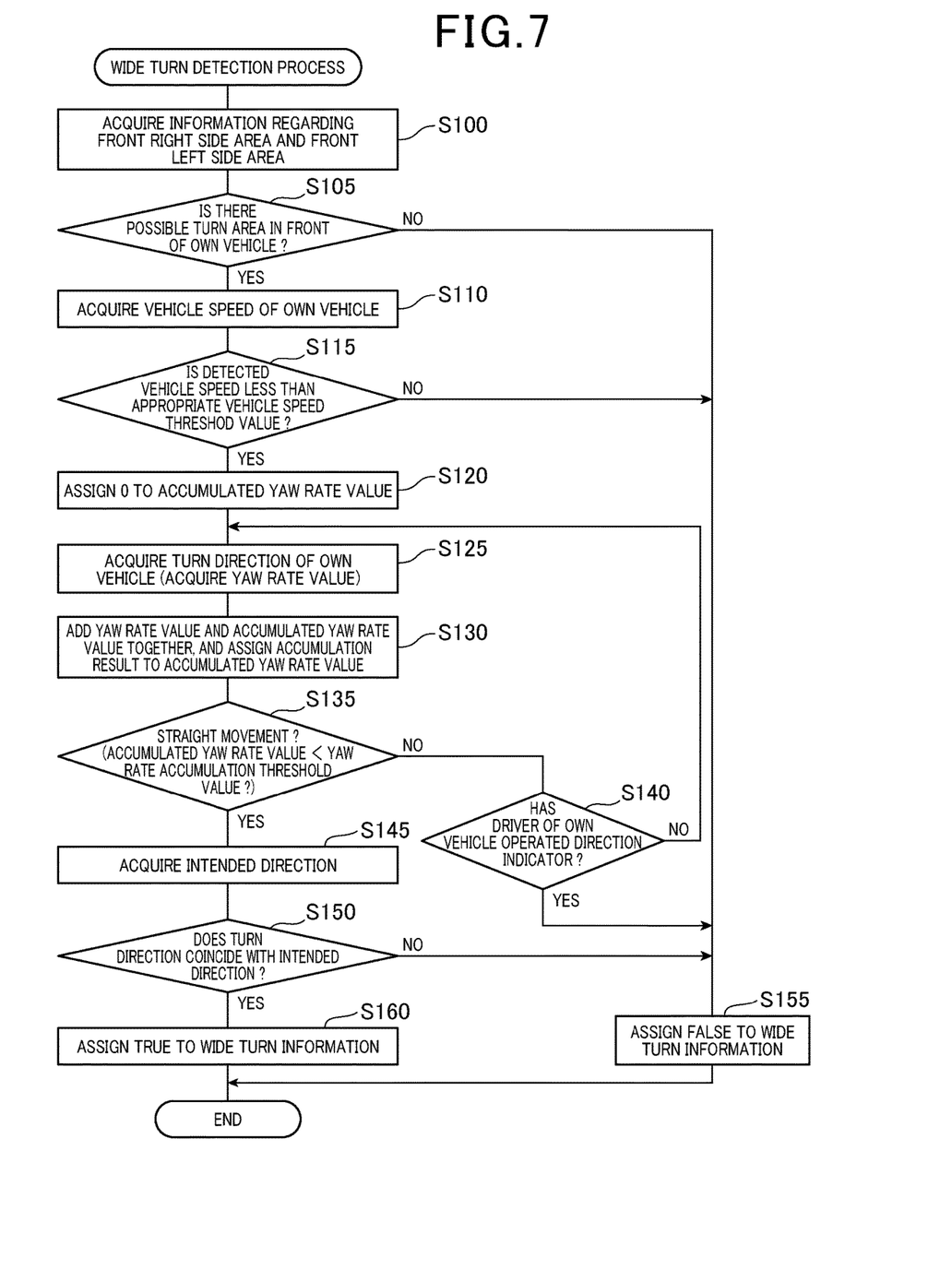
FIG. 7 is flow chart showing a wide turn detection process executed by the control section as the vehicle behavior detection device according to a third exemplary embodiment of the present invention.

FIG. 7 is flow chart showing the wide turn detection process executed by the control section 60 as the vehicle behavior detection device according to the third exemplary embodiment. When compared with the flow chart shown in FIG. 3, the flow chart shown in FIG. 7 has additional steps S100 and S105.

(Process)

In step S100 shown in FIG. 7, the control section 60 acquires information regarding a front right side area and a front left side area of the own vehicle 100. The information regarding the front right side area and front left side area indicate whether or not there is a right turn possible area or a left turn possible area in front of the own vehicle 100 on the roadway. Specifically, the control section 60 performs the image processing of the image captured by the camera unit 10, and extract traffic signs, for example, a traffic arrow mark which introduces for the driver of the own vehicle to a shop or a carpool, and outputs the result of the image processing as the information regarding the front right side area and the front left side area of the own vehicle 100. The operation flow progresses to step S105.

In step S105, the control section 60 detects whether or not there is a possible turn area in front of the own vehicle 100 to turn right or turn left in the front area of the own vehicle 100. Specifically, when the control section 60 detects a left side arrow mark in a signboard to introduce vehicles into a shop in the information regarding a front right side area and a front left side area of the own vehicle 100, the control section 60 detects that the own vehicle 100 can turn left in front of the roadway.

When the information regarding a front right side area and a front left side area of the own vehicle 100 does not indicate any possible turn right or left in front of the own vehicle 100, the operation flow progresses to step S155.

In step S155, the control section 60 assigns the value of FALSE to the wide turn information. The control section 60 completes the driving supporting process shown in FIG. 7.

On the other hand, when the information regarding the front right side area and the front left side area of the own vehicle 100 indicates a possible turn right or left in front of the own vehicle 100, the operation flow progresses to step S110.

In the wide turn detection process shown in FIG. 7, because the control section 60 performs the same processes of step S110 to S160 shown in FIG. 3 previously explained, the explanation of the same steps is omitted here.

[3-3] Effects

A description will now be given of the effects of the control section 60 as the vehicle behavior detection device according to the third exemplary embodiment.

The control section 60 according to the third exemplary embodiment has the following effects [3A] in addition to the effects [1A] to [1D] previously described in the explanation of the first exemplary embodiment.

[3A] In addition to intersections, there are possible areas in front of the own vehicle 100 where the own vehicle 100 will turn right or left, for example.

The control section 60 detects whether or not the own vehicle 100 is turning widely at the possible turn right or left area in front of the own vehicle 100. When the detection result indicates that there is an possible turn right or left area in front of the own vehicle 100 on the roadway, the control section 60 executes the wide turn detection in step S150 shown in FIG. 7. That is, as has been explained in the first exemplary embodiment, the control section 60 detects whether or not the acquired turn direction obtained in step S125 coincides with the intended direction obtained in step S145.

According to the process in step S150 shown in FIG. 7, it is possible for the control section 60 to perform the driving support suitable for the wide turn of the own vehicle 100 when there is the possible turn right or left area in front of the own vehicle 100.

Further, when the detection result indicates that there is no possible turn right or left area in front of the own vehicle 100 on the roadway, the control section 60 does not perform the process of detecting occurrence of the wide turn of the own vehicle 100. This makes it possible to have the effect, similar to the effect [1B] previously described, for performing the wide turn detection process only when the own vehicle 100 turns on the roadway.

The process in step S100 shown in FIG. 7 corresponds to a right or left turn information acquiring section. The process in step S155 shown in FIG. 7 corresponds to a third inhibition section.

(Other Modifications)

The concept of the vehicle behavior detection device according to the present invention is not limited by the examples according to the first, second and third exemplary embodiments previously described. The present invention provides following modifications 4A, 4B, 4C, 4D and 4E, for example.

[4A] In the exemplary embodiments previously described, the driving support process uses the wide turn detection result so as to provide the warning to the driver of the own vehicle 100 at the U-turn restriction area on the roadway or when the control section 60 uses the adaptive front-lighting system (AFS).

However, the concept of the present invention is not limited by the first, second and third exemplary embodiments which perform the driving support process on the basis of the wide turn detection results. It is possible to apply the wide turn detection results in order to realize various functions of the driving support process.

[4B] The control device 60 according to the first, second and third exemplary embodiments uses the direction indicator 20 operated by the driver of the own vehicle 100 in order to acquire the intended direction of the own vehicle 100.

However, the concept of the present invention is not limited by the disclosure of these first to third exemplary embodiments previously described. For example, it is possible for the control section 60 to acquire navigation information transmitted from a navigation system mounted on the own vehicle 100, and specify the intended direction of the own vehicle 100 to turn right or left on the basis of the acquired navigation information. That is, the control section 60 can use the acquired navigation information in order to specify the intended direction of the own vehicle 100 because the driver of the own vehicle 100 has inputted an indicated travel route of the own vehicle 100 into the navigation system, and the control section 60 specifies the direction to turn right or left on the basis of the acquired navigation information.

[4C] The control device 60 according to the first, second and third exemplary embodiments acquires the steering direction and the steering angle transmitted from the yaw rate sensor 30. However, the concept of the present invention is not limited by the disclosure of the second exemplary embodiment. For example, it is possible for the control section 60 to use a steering angle sensor capable of detecting a direction and angle of the steering wheel operated by the driver of the own vehicle 100.

[4D] It is acceptable to divide, into a plurality of components, the function of each of the components of the control section 60 and the driving support section 50 according to the first to third exemplary embodiments. It is also acceptable to combine, into a single component, the functions of two or more components of the control section 60 and the driving support section 50 according to the first to third exemplary embodiments.

It will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

[4E] It is possible to use programs in order to realize the functions of the control section 60, the driving support section 50 and the driving support system 1. It is also possible to use a non-transitory computer-readable storage medium for storing these programs. Further, it is possible to use a method of performing the functions of the control section 60 and the driving support section 50.

What is claimed is:

1. A vehicle behavior detection device to be mounted on an own vehicle, comprising a computer system including a central processing unit, the computer system being configured to provide:
   an intended turning direction acquiring section configured to receive a detection signal detected by and transmitted from a direction indicator mounted on the own vehicle, the detection signal representing an operation state of the own vehicle, the intended turning direction acquiring section configured to acquire an intended turning direction of the own vehicle on the basis of the received detection signal;
   an actual turning direction acquiring section configured to receive turning data of the own vehicle that is detected by and transmitted from a yaw rate sensor mounted on the own vehicle, the actual turning direction acquiring section configured to acquire an actual turning direction of the own vehicle on the basis of the received turning data;
   a coinciding turning direction determination section configured to determine whether the intended turning direction of the own vehicle coincides with the actual turning direction of the own vehicle; and
   an information output section configured to output wide turn information to a driver of the own vehicle, the wide turn information indicating that the own vehicle is making a wide turn when the coinciding turning direction determination section determines that the intended turning direction of the own vehicle does not coincide with the actual turning direction of the own vehicle.

2. The vehicle behavior detection device according to claim 1, further comprising:
   a vehicle speed acquiring section configured to receive a vehicle speed signal detected by and transmitted from a vehicle speed sensor mounted on the own vehicle, the vehicle speed acquiring section configured to acquire a vehicle speed of the own vehicle;
   a vehicle speed threshold comparison determination section configured to determine whether the vehicle speed of the own vehicle is less than a vehicle speed threshold value for performing a left turn or a right turn; and
   a first information output inhibiting section configured to inhibit the information output section from outputting the wide turn information when the vehicle speed threshold comparison determination determines that the vehicle speed of the own vehicle is not less than the vehicle speed threshold value.

3. The vehicle behavior detection device according to claim 1, further comprising:
   a straight movement detection section configured to receive the turning data from the yaw rate sensor, integrate the turning data, and generate an integrated yaw rate value, the straight movement detection section configured to determine whether the own vehicle is moving straight by comparing the integrated yaw rate value to a predetermined yaw rate integration threshold value;
   a second information output inhibiting section configured to inhibit the information output section from outputting the wide turn information when the straight movement detection section determines that the own vehicle is moving straight.

4. The vehicle behavior detection device according to claim 2, further comprising:
   a straight movement detection section configured to receive the turning data from the yaw rate sensor, integrate the turning data, and generate an integrated yaw rate value, the straight movement detection section configured to determine whether the own vehicle is moving straight by comparing the integrated yaw rate value to a predetermined yaw rate integration threshold value;
   a second information output inhibiting section configured to inhibit the information output section from outputting the wide turn information when the straight movement detection section determines that the own vehicle is moving straight.

5. The vehicle behavior detection device according to claim 1, further comprising:
   a right or left turn information acquiring section configured to receive image data detected by and transmitted from a camera unit mounted on the own vehicle, and configured to acquire, based on the image data, information regarding a front right side area and a front left side area of the own vehicle with which the right or left turn information acquiring section determines whether a right turn possible area or a left turn possible area exists in front of the own vehicle; and
   a third information output inhibiting section configured to inhibit the information output section from outputting the wide turn information when the right or left turn information acquiring section determines there is no right turn possible area and no left turn possible area in front of the own vehicle.

6. The vehicle behavior detection device according to claim 2, further comprising:
   a right or left turn information acquiring section configured to receive image data detected by and transmitted from a camera unit mounted on the own vehicle, and configured to acquire, based on the image data, information regarding a front right side area and a front left side area of the own vehicle with which the right or left turn information acquiring section determines whether a right turn possible area or a left turn possible area exists in front of the own vehicle; and
   a third information output inhibiting section configured to inhibit the information output section from outputting the wide turn information when the right or left turn information acquiring section determines there is no right turn possible area and no left turn possible area in front of the own vehicle.

7. The vehicle behavior detection device according to claim 1, further comprising a wide turn driving assist section configured to execute a predetermined driving assist function for the own vehicle to turn safely when the information output section outputs the wide turn information.

8. The vehicle behavior detection device according to claim 2, further comprising a wide turn driving assist section configured to execute a predetermined driving assist function for the own vehicle to turn safely when the information output section outputs the wide turn information.

9. The vehicle behavior detection device according to claim 1, further comprising:
   a right or left turn information acquiring section configured to receive map information transmitted from a navigation system mounted on the own vehicle, and configured to acquire, based on the received map information, information regarding a front right side area and a front left side area of the own vehicle with which the right or left turn information acquiring section determines whether a right turn possible area or a left turn possible area exists in front of the own vehicle; and
   a third information output inhibiting section to inhibit the information output section from outputting the wide turn information when the right or left turn information acquiring section determines there is no right turn possible area and no left turn possible area in front of the own vehicle.

10. The vehicle behavior detection device according to claim 2, further comprising:
    a right or left turn information acquiring section configured to receive map information transmitted from a navigation system mounted on the own vehicle, and configured to acquire, based on the received map information, information regarding a front right side area and a front left side area of the own vehicle with which the right or left turn information acquiring section determines whether a right turn possible area or a left turn possible area exists in front of the own vehicle; and
    a third information output inhibiting section configured to inhibit the information output section from outputting the wide turn information when the right or left turn information acquiring section determines there is no right turn possible area and no left turn possible area in front of the own vehicle.

11. The vehicle behavior detection device according to claim 1, further comprising:
    a right or left turn information acquiring section configured to receive a detection result detected by and transmitted from a radar device mounted on the own vehicle, and configured to acquire, based on the received detection result, information regarding a front right side area and a front left side area of the own vehicle with which the right or left turn information acquiring section determines whether a right turn possible area or a left turn possible area exists in front of the own vehicle; and
    a third information output inhibiting section configured to inhibit the information output section from outputting the wide turn information when the right or left turn information acquiring section determines there is no right turn possible area and no left turn possible area in front of the own vehicle.

12. The vehicle behavior detection device according to claim 2, further comprising:
    a right or left turn information acquiring section configured to receive a detection result detected by and transmitted from a radar device mounted on the own vehicle, and configured to acquire, based on the received detection result, information regarding a front right side area and a front left side area of the own vehicle with which the right or left turn information acquiring section determines whether a right turn possible area or a left turn possible area exists in front of the own vehicle; and
    a third information output inhibiting section configured to inhibit the information output section from outputting the wide turn information when the right or left turn information acquiring section determines there is no right turn possible area and no left turn possible area in front of the own vehicle.

* * * * *